(12) United States Patent
Yang et al.

(10) Patent No.: US 8,588,243 B2
(45) Date of Patent: Nov. 19, 2013

(54) QUEUE SCHEDULING METHOD AND APPARATUS

(75) Inventors: Yi Yang, Guangdong Province (CN); Wei Huang, Guangdong Province (CN); Mingshi Sun, Guangdong Province (CN)

(73) Assignee: ZTE Corporation, Shenzhen, Guangdong Province (CN)

( * ) Notice: Subject to any disclaimer, the term of this patent is extended or adjusted under 35 U.S.C. 154(b) by 102 days.

(21) Appl. No.: 13/389,299

(22) PCT Filed: Apr. 22, 2010

(86) PCT No.: PCT/CN2010/072074
§ 371 (c)(1),
(2), (4) Date: Feb. 7, 2012

(87) PCT Pub. No.: WO2011/015063
PCT Pub. Date: Feb. 10, 2011

(65) Prior Publication Data
US 2012/0134371 A1 May 31, 2012

(30) Foreign Application Priority Data
Aug. 7, 2009 (CN) .......................... 2009 1 0164068

(51) Int. Cl.
*H04L 12/28* (2006.01)
(52) U.S. Cl.
USPC ............ 370/412; 370/413; 370/428; 370/429
(58) Field of Classification Search
USPC ......... 370/229, 389, 395.4, 395.41, 412, 428, 370/429
See application file for complete search history.

(56) References Cited

U.S. PATENT DOCUMENTS 5,940,829 A * 8/1999 Tsuiki et al. .................. 370/468
(Continued)

FOREIGN PATENT DOCUMENTS

CN 1798092 A 7/2006
(Continued)

OTHER PUBLICATIONS

International Search Report dated Jul. 22, 2010 issued in corresponding International Application No. PCT/CN2010/072074.
Supplementary European Search Report dated Dec. 14, 2012 issued in European Application No. EP 10 80 5967.6.

*Primary Examiner* — Anh-Vu Ly
*Assistant Examiner* — Gustavo Lopez-Vargas
(74) *Attorney, Agent, or Firm* — Scully, Scott, Murphy & Presser, P.C.

(57) ABSTRACT

A queue scheduling method and apparatus is disclosed in the embodiments of the present invention, the method comprises: one or more queues are indexed by using a first circulation link list; one or more queues are accessed respectively by using the front pointer of the first circulation link list, and the value acquired from subtracting a value of a unit to be scheduled at the head of the queue from a weight middle value of each queue is treated as the residual weight middle value of the queue; when the weight middle value of one queue in the first circulation link list is less than the unit to be scheduled at the head of the queue, the queue is deleted from the first circulation link list and the weight middle value is updated with the sum of a set weight value and the residual weight middle value of the queue; the queue deleted from the first circulation link list is linked with a second circulation link list. The present invention enables the scheduling to support any number of queues, and supports the expansion of the number of queues under the circumstances that the hardware implementation logic core is not changed.

16 Claims, 5 Drawing Sheets

(56) References Cited

U.S. PATENT DOCUMENTS

| | | |
|---|---|---|
| 6,138,172 A | 10/2000 | Shimonishi |
| 2003/0179774 A1* | 9/2003 | Saidi et al. .................. 370/468 |
| 2003/0214964 A1 | 11/2003 | Shoham et al. |
| 2003/0223443 A1* | 12/2003 | Petty ............................ 370/412 |
| 2004/0085982 A1* | 5/2004 | Choi ............................. 370/412 |
| 2005/0038793 A1 | 2/2005 | Romano et al. |
| 2005/0129044 A1* | 6/2005 | Katayama .................... 370/412 |
| 2005/0147034 A1 | 7/2005 | Zhao et al. |

FOREIGN PATENT DOCUMENTS

| | | |
|---|---|---|
| CN | 1972242 A | 5/2007 |
| CN | 101621478 A | 1/2010 |
| WO | 97/04558 A1 | 2/1997 |
| WO | 02/062013 A2 | 8/2002 |

* cited by examiner

QUEUE SCHEDULING METHOD AND APPARATUS

FIELD OF THE INVENTION

The present invention relates to the communication field, and in particular to a method and apparatus for scheduling queues.

BACKGROUND OF THE INVENTION

Figure 2:
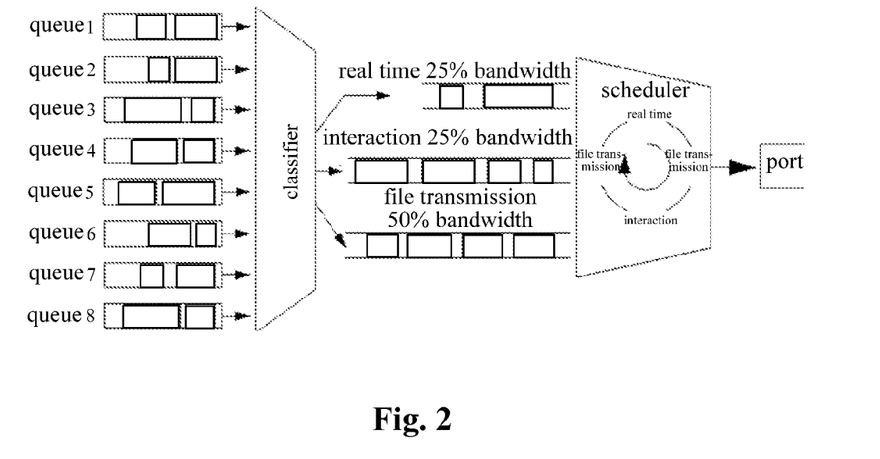
FIG. 2 is a schematic diagram of WRR scheduling according to the related art.

The traditional queue scheduling algorithm with weight is Weighted Round Robin (referred to as WRR), and the schematic diagram of WRR scheduling according to the related art is shown in FIG. 2. As shown in FIG. 2, when being sent to a queue, a message is first sent, according to its priority, to the queue of corresponding priority. When scheduling, queues with different priorities are selected according to a method of polling. The number of messages sent out is proportional to the weight of the queue in each cycle.

Each port is distributed into a plurality of output queues by way of WRR scheduling. These queues are scheduled in turn to ensure that each queue has a certain service time. At the same time, a weight is allocated to each queue, and the value thereof represents the ratio of resources acquired for that queue. Taking a 100 Mbps port as an example, the weight values of the WRR queue scheduling algorithms allocated to the port are 50, 30, 10, 10, so that the queue with the lowest priority is assured to obtain at least 10 Mbps bandwidth, thereby avoiding the disadvantage that messages in the queue with a low priority may not acquire any service for a long time when a Strict Priority scheduling is used.

Apparently, it is difficult for pure WRR algorithms to support length-varied flows, especially sudden flows. Therefore Deficit Weighted Round Robin (referred to as DWRR) algorithm emerges.

Figure 3:
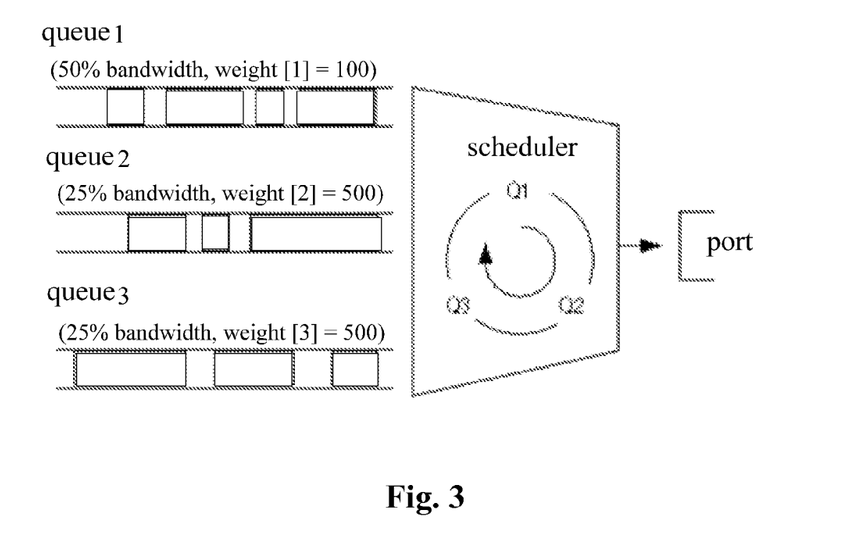
FIG. 3 is a schematic diagram of DWRR scheduling according to the related art.
Figure 4:
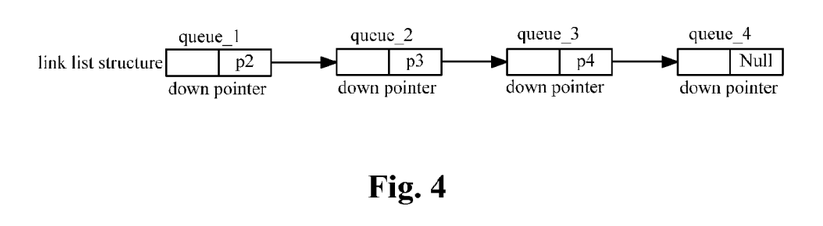
FIG. 4 is a structural schematic diagram of a queue link list according to embodiments of the present invention.

FIG. 3 is a schematic diagram of DWRR scheduling according to the related art, and as shown in FIG. 3, a weight value W and a weight middle value DC are set for each queue, so that the weight middle value DC is less than or equal to the weight value. A scheduler accesses each non-Empty queue, and if the packet length at the head of the queue is greater than DC, the scheduler moves to the next queue. If the packet at the head of the queue is less than or equal to DC, variable DC reduces the number of the bytes of the packet length, and transfers the packet to the output port. The scheduler continuously outputs packets and reduces the DC value, until the packet length at the head of the queue is greater than the value of the variable DC, and the residual DC value will be used as a credit value to be accumulated to the next polling. If the queue is Empty, DC is set to zero, and the scheduler will then service the next non-Empty queue.

DWRR can support scheduling for variable length messages and has a very good application perspective in engineering. But, how to achieve hardware implementation, especially a method that supports the easy expansion of the number of queues without changing the hardware implementation logic core, is always a hotspot for current research. It is very difficult for common binary tree implementation methods to support many queues, and the development difficulties are increased when the core logic has to be changed in order to expand the number of queues.

Currently, no effective solutions have been proposed for the problem that it is difficult to support the expansion of the number of queues and also difficult to implement the DWRR scheduling unit with less resource consumption in the precondition that the hardware implementation logic core is not changed.

SUMMARY OF THE INVENTION

The present invention is proposed in view of the problem that it is difficult to support the expansion of the number of queues and also difficult to implement a DWRR scheduling unit with less resource consumption in the precondition that the hardware implementation logic core is not changed. To this end, the main object of the present invention is to provide a queue scheduling method and apparatus to address the above problems.

To achieve the above object, a queue scheduling method is provided according to one aspect of the present invention.

A queue scheduling method according to the present invention comprises: one or more queues being indexed by using a first circulation link list; one or more queues being accessed respectively by using the front pointer of the first circulation link list, and the value acquired by subtracting a value of a unit to be scheduled at the head of the queue from a weight middle value of each queue being treated as the residual weight middle value of the queue; when the weight middle value of one queue in the first circulation link list is less than the unit to be scheduled at the head of the queue, the queue being deleted from the first circulation link list and the weight middle value being updated to be the sum of a set weight value and the residual weight middle value of the queue; and the queue deleted from the first circulation link list being linked to a second circulation link list.

Preferably, the method may also comprise: accessing one or more queues according to the first circulation link list continuously, when there is one queue in the first circulation link list the weight middle value of which is not less than the unit to be scheduled at the head of the queue.

Preferably, making an index for one or more queues by using the first circulation link list comprises: setting weights for one or more queues; and initializing the weight middle values of one or more queues to be the weight value, the set value to be zero, the queue status to be empty and the linked-in flag to be not linked-in.

Preferably, accessing one or more queues respectively by using the front pointer of the first circulation link list and subtracting the value of a unit to be scheduled at the head of the queue from a weight middle value of each queue comprises: reading out the front pointer of the first circulation link list, determining the number of the currently scheduled queue by the front pointer, and accessing the first circulation link list by using the front pointer value of the first circulation link list as an address; and when the status of the currently scheduled queue is not empty and the weight middle value is greater than or equal to the value of the unit to be scheduled at the head of the queue, subtracting the value of the unit to be scheduled at the head of the queue from the weight middle value.

Preferably, the method also comprises: reading out the end pointer of the first circulation link list, accessing the currently scheduled queue by using the end pointer of the first circulation link list as an address, and writing the front pointer of the first circulation link list into the position of the next hop pointer; updating the end pointer of the first circulation link list by using the front pointer of the first circulation link list; and accessing the queue by using the front pointer of the first circulation link list as the address to get the next hop pointer, so as to update the front pointer of the first circulation link list.

Preferably, deleting the queue from the first circulation link list when the weight middle value of a queue in the link list is less than the unit to be scheduled at the head of the queue further comprises: deleting the queue from the first circulation link list and not adding the queue to a second circulation link list when the queue status shows as empty.

Preferably, the method also comprises: deleting the queue from the first circulation link list and then adding the queue to the end of a second circulation link list, if the status of the queue is not empty and the weight middle value is less than the value of the unit to be scheduled at the head of the queue.

Preferably, linking the queue deleted from the first circulation link list to a second circulation link list comprises: linking the queue to the second circulation link list when the queue status jumps from empty to non-empty and the linked-in flag is not linked-in.

Preferably, the method also comprises: the first circulation link list and the second circulation link list being exchanged when the first circulation link list is empty.

To achieve the above object, a queue scheduling apparatus is provided according to another aspect of the present invention.

The apparatus comprises: a first circulation link list and a second circulation link list both of which use a structure of a unidirectional link list; the front pointer of the first circulation link list and the end pointer of the first circulation link list, as well as one or more queues are linked as a circulation structure; and the front pointer of the second circulation link list and the end pointer of the second circulation link list, as well as one or more queues are linked as a circulation structure, wherein the queues are linked with each other by pointers, and when the weight middle value of a queue in the first circulation link list is less than the unit to be scheduled at the head of the queue, that queue is deleted from the first circulation link list, and the queue is linked to the second circulation link list; and when the first circulation link list is empty, the first circulation link list and the second circulation link list are exchanged.

The present invention employs the method of making an index for one or more queues by using a first circulation link list; accessing one or more queues respectively by using the front pointer of the first circulation link list and subtracting the value of a unit to be scheduled at the head of the queue from a weigh middle value of each queue; deleting that queue from the first circulation link list and updating the weight middle value to the sum of a set weight value and the residual weight middle value when the weight middle value of a queue in the first circulation link list is less than the unit to be scheduled at the head of the queue; and linking the queue deleted from the first circulation link list to a second circulation link list. It solves the problem that it is difficult to support the expansion of the number of queues and to implement the DWRR scheduling unit with less resource consumption is resolved by virtue of the present invention, so as to enable the scheduling to support any number of queues and to support the expansion of the number of queues under the circumstances that the hardware implementation logic core is not changed.

BRIEF DESCRIPTION OF THE DRAWINGS

The drawings illustrated here provide a further understanding of the present invention and form a part of the present application. The exemplary embodiments and the description thereof are used to explain the present invention without unduly limiting the scope of the present invention. In the drawings.

DETAILED DESCRIPTION OF EMBODIMENTS

Considering that it is difficult to support the expansion of the queue quantity and also difficult to implement the DWRR scheduling unit with less resource consumption on the premise that the hardware implementation logic core is not changed, a queue scheduling method and apparatus is provided in embodiments of the present invention. The method comprises: indexing one or more queues by using a first circulation link list; accessing one or more queues by using the front pointer of the first circulation link list and subtracting the value of the unit to be scheduled at the head of each queue from a weight middle value of one queue; deleting one queue from the first circulation link list and updating the weight middle value with the sum of a set weight value and the residual weight middle value when the weight middle value of the queue in the first circulation link list is less than the unit to be scheduled at the head of the queue; and linking the queue deleted from the first circulation link list with a second circulation link list.

It needs to be noted that the embodiments of the present invention and the features in the embodiments can be combined with each other if there is no conflict. The present invention will be described hereinafter in detail with reference to the drawings and in conjunction with the embodiments.

The implementation scale of a scheduling unit generally increases greatly as the number of scheduled queues increases, with a nonlinear increasing trend. How to support queues as many as possible is currently a hotspot in schedule algorithm research. The present invention proposes an implementation method according to the characteristics of DWRR algorithms, and employs a solution for alternatively switching an Active link list and a Standby link list to support scheduling any quantity of queues. By virtue of the present invention, a complex scheduling algorithm is achieved by using a simple link list operation based on storage accessing by way of linking all queues to be scheduled with two unidirectional link lists. When the number of scheduled queues increases, only that size of the link list storage increases linearly, and it is not necessary to change algorithm logics and data structures, which is advantageous for the expansion of the queue quantity.

In present invention, "Active and Standby link list updating in a cycle" is specifically as follows: the function of a scheduling unit is to determine the number of serviced queues in each scheduling period, thus the weight of each queue, $W_i$, is used to represent the number of the services that should be assigned in a scheduling cycle. For example, as shown in FIG. 7, there are 6 queues, A to F, the weights of individual queues are represented by WA to WF respectively, and the currently un-serviced residual values are represented by DCA to DCF.

Figure 7:
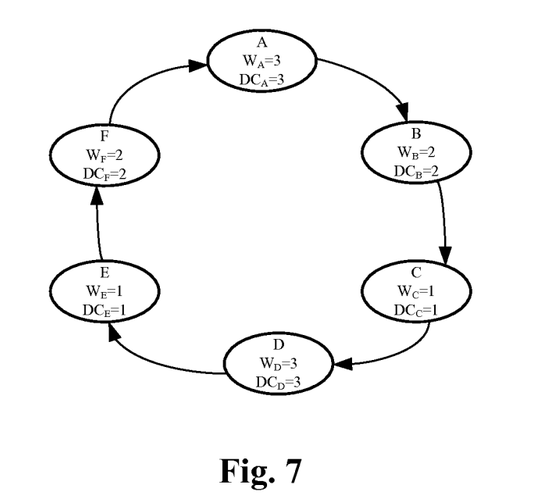
FIG. 7 is a schematic diagram of an Active link list of a queue group according to embodiments of the present invention.
Figure 8:
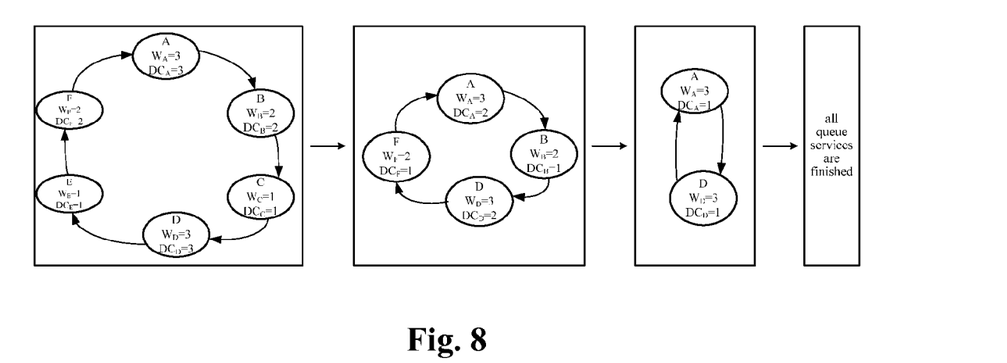
FIG. 8 is a schematic diagram of updating an Active link list according to embodiments of the present invention.
Figure 9:
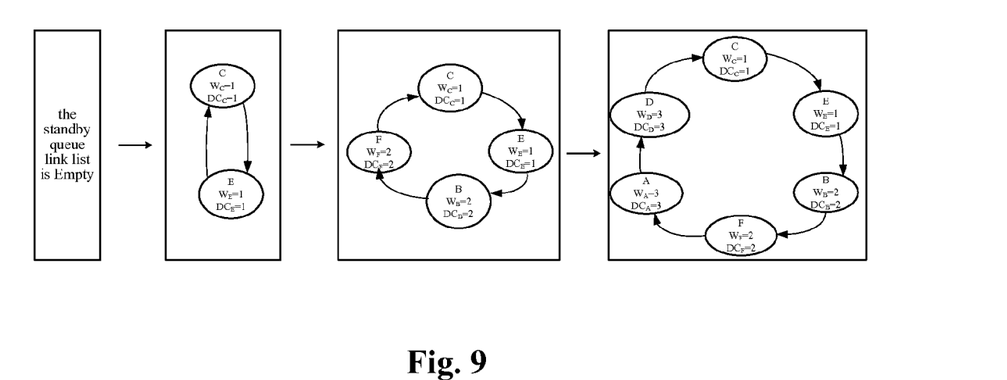
FIG. 9 is a schematic diagram of updating a Standby link list according to embodiments of the present invention.

FIG. 7 is a schematic diagram of an Active link list of a queue group according to the embodiments of the present invention; FIG. 8 is a schematic diagram of updating an Active link list according to the embodiments of the present invention; and FIG. 9 is a schematic diagram of updating a standby link list according to the embodiments of the present invention. After each queue is serviced, the size of the first packet standardized according to the number of the services (i.e. Psize, and Psize is dynamic, and is the size of the packet at the head of the queue) will be subtracted from the DCi value of the queue. Here, the size of the first packet is a unit to be scheduled. For the convenience of description, the number of the services for each queue in a sample queue group may be simplified as 1. When the DCi value of the queue is less than Psize, the queue is deleted from the Active link list, ensuring that all the queues in the Active link list are queues that can acquire services, and the queue is linked to the tail of the Standby link list, and at the same time its DCi value is updated to the sum of its weight Wi and the residual DCi value.

When the Active link list is Empty, it means that the current cycle ends. The Standby link list and the Active link list are exchanged to continue to a new cycle.

Figure 1:
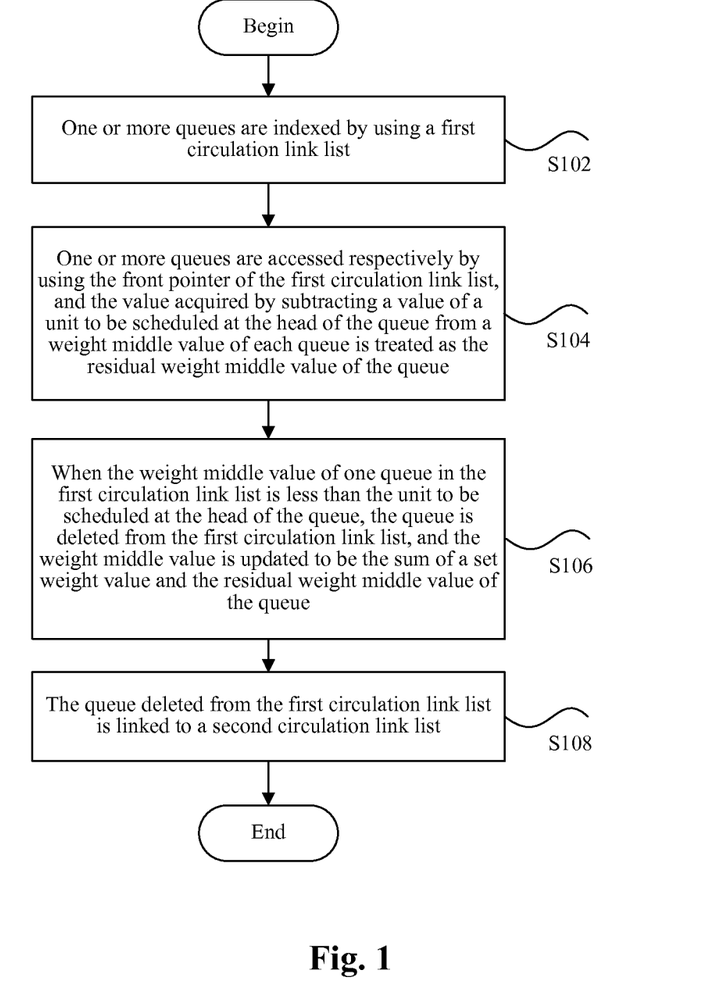
FIG. 1 is a flow chart of a scheduling method according to embodiments of the present invention.

A queue scheduling method is provided according to the embodiments of the present invention. FIG. 1 is a flow chart of a scheduling method according to the embodiments of the present invention, the method comprises step S102 to step S108.

Step S102, one or more queues are indexed by using a first circulation link list.

Step S104, one or more queues are accessed respectively by using the front pointer of the first circulation link list, and the value acquired by subtracting a value of a unit to be scheduled at the head of the queue from a weight middle value of each queue is treated as the residual weight middle value of the queue.

Step S106, when the weight middle value of one queue in the first circulation link list is less than the unit to be scheduled at the head of the queue, the queue is deleted from the first circulation link list and the weight middle value is updated with the sum of a set weight value and the residual weight middle value of the queue.

Step S108, the queue deleted from the first circulation link list is linked with a second circulation link list.

Preferably, the above method may also comprise the steps of:

Step S110, the first circulation link list and the second circulation link list are exchanged when the first circulation link list is Empty; and perform the operation of the next cycle.

The above steps from S104 to S110 are circulation operations which are circulated in the link list.

The process of implementing the embodiment of the present invention will be described in detail hereinafter.

The following operations are specifically used in the scheduling method.

Link List Initialization

In step S102, after the weights of all queues have been set by a user, an initialization process is started. After initializing, the DC values of all queues are equal to the weight values, Psize is 0, the queue status is Empty, the linked-in flag is not Linked-in, and the content of next hop pointer has no meaning.

Queue Moving

In step S104, the front pointer of an Active link list is read out to determine the sequential number of the currently scheduled queue. The front pointer value of the Active link list is used as the address to access the storage of the queue link list, and the DC value is updated with the result acquired by subtracting the Psize value from its original DC value, when the queue status is not Empty and the DC value is greater than or equal to the Psize value.

The Active tail pointer is read out, the value of the Active tail pointer is used as an address to access a queue link list storage, and the value of the Active front pointer is written into the position of a "next hop pointer".

The Active tail pointer storage is updated by using the Active front pointer value.

The queue link list storage is accessed by using the Active front pointer value as an address to obtain the next hop pointer, thus the original Active front pointer is updated.

Queue Inserting

In step S108, if the status of a queue jumps from Empty to non-Empty, at the same time its linked-in flag indicates it is not Linked in, then the queue is added to the tail of the Standby link list.

Queue Deleting

In step S106, the status of the queue is determined when a queue is scheduled, i.e. the Active front pointer of DWRR points to the queue. If the queue status is Empty, a link deleting operation is triggered, i.e. the queue is deleted from the Active link list, and the queue is not added to the Standby link list. After the queue is deleted from the link, its linked-in flag is cleared.

If the queue status is not Empty, but its DC value is less than the Psize value, it indicates that the queue has been designated as deserving services in the current cycle, and the queue is deleted from the Active link list and the queue is added to the tail of the Standby link list. At the same time, the DC value is updated with the sum of its weight and the residual DC value.

Link List Exchanging

In step S110, when the Active link list is Empty, i.e. the Active front pointer and the Active tail pointer are the same and equal to the currently scheduled queue, it indicates that the current cycle of scheduling has been finished, and the Active link list and the Standby link list are exchanged.

A queue scheduling apparatus is provided according to the embodiments of the present invention. The apparatus comprises: a first circulation link list and a second circulation link list, and both of them use a structure of a unidirectional link list; the front pointer of the first circulation link list and the tail pointer of the first circulation link list, as well as one or more queues are linked as a circulation structure; and the front pointer of the second circulation link list and the tail pointer of the second circulation link list, as well as one or more queues are linked as a circulation structure, wherein the queues are linked with each other by pointers, when the weight middle value of a queue in the first circulation link list is less than the unit to be scheduled at the head of the queue, the queue is deleted from the first circulation link list, and the queue is linked to the second circulation link list; and when the first circulation link list is Empty, the first circulation link list and the second circulation link list are exchanged, i.e. the first circulation link list is switched to the second circulation link list and at the same time the second circulation link list is switched to the first circulation link list.

Figure 5:
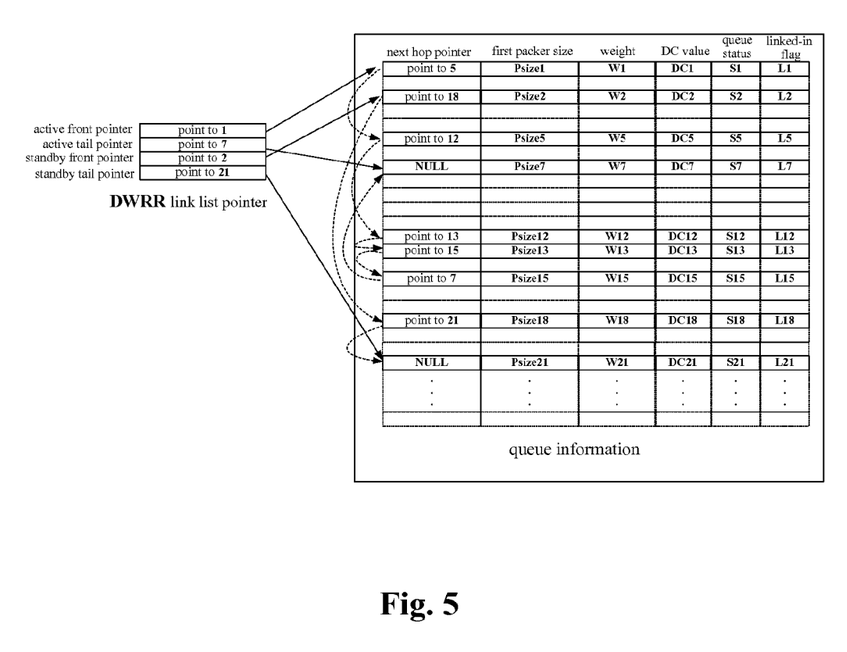
FIG. 5 is a schematic diagram of the link relationships between Active/Standby front/tail pointers and queues according to embodiments of the present invention.

FIG. 5 is a schematic diagram of the link relationships between Active/Standby front/tail pointers and queues according to the embodiments of the present invention. Information required to be stored for each queue also includes queue status, size of the first packet and a linked-in flag, in addition to weight, DC value and the next hop pointer. The queue status shows that a queue is currently in Empty status or in non-Empty status; the size of the first packet represents the packet length of the first message in the current queue and is a unit to be scheduled; a linked-in flag indicates if a queue has been added to a DWRR queue link list.

Figure 6:
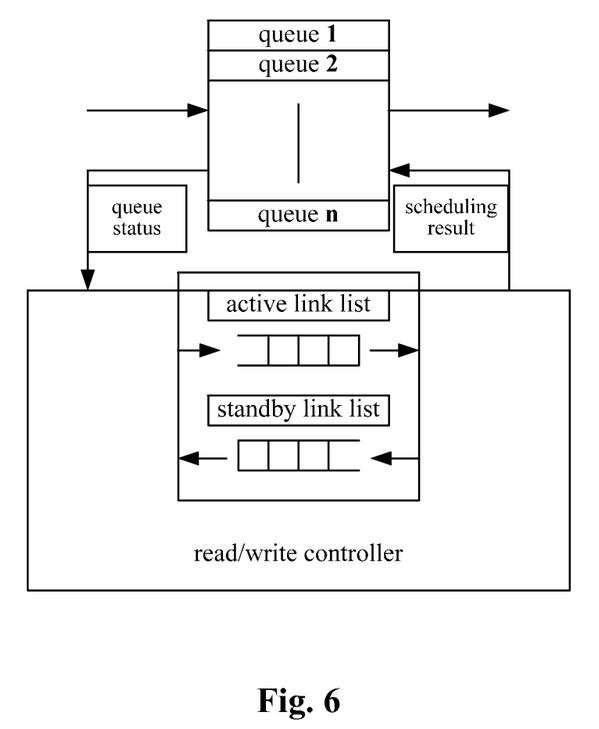
FIG. 6 is a schematic chart of a scheduling apparatus according to embodiments of the present invention.

FIG. 6 is a schematic diagram of a scheduling apparatus according to the embodiments of the present invention. The queue scheduling apparatus provided according to the present invention is built in a data exchange device or a traffic control device based on a Store-and-Forward switching mechanism. Here, the device includes but is not limited to switching device, routing device and transferring device.

It can be seen from the above descriptions, that the present invention enables the scheduling to support any number of queues and supports the expansion of the queue quantity under the circumstances that the hardware implementation logic core is not changed.

The above description is only to illustrate the preferred embodiments of the present invention but not to limit the present invention. Various alterations and changes to the present invention are apparent to those skilled in the art. The protection scope defined in claims shall comprise any modification, equivalent substitution, improvement etc, within the spirit and principle of the present invention.

What is claimed is:

1. A queue scheduling method, comprising: indexing one or more queues by using a first circulation link list; accessing the one or more queues respectively, using a read/write controller, by using a front pointer of the first circulation link list, and treating a value acquired by subtracting a value of a unit to be scheduled at the head of each queue from a weight middle value of the queue, as the residual weight middle value of the queue; deleting one queue from the first circulation link list and updating the weight middle value with the sum of a set weight value and the residual weight middle value of the queue when the weight middle value of the queue in the first circulation link list is lees than the unit to be scheduled at the head of the queue; and linking the queue deleted from the first circulation link list with a second circulation link list.

2. The method according to claim 1, wherein the method further comprises:
accessing one or more queues according to the first circulation link list continuously, when the first circulation link list has one queue the weight middle value of which is not less than the unit to be scheduled at the head of the queue.

3. The method according to claim 1, wherein indexing one or more queues by using the first circulation link list comprises:
setting weights for the one or more queues; and
initializing the weight middle value of the one or more queues to be a weight value, the set value to be zero, a queue status to be Empty, and a linked-in flag to be Not Linked-in.

4. The method according to claim 1, wherein accessing the one or more queues by using the front pointer of the first circulation link list and subtracting the value of the unit to be scheduled at the head of the queue from the weight middle value of each queue comprises:
reading out the front pointer of the first circulation link list, determining the sequential number of currently scheduling queue by the front pointer, and accessing the first circulation link list by using the front pointer of the first circulation link list as the address; and
subtracting the value of the unit to be scheduled at the head of the queue in the currently scheduled queue from the weight middle value, when the queue status of the currently scheduled queue is not Empty and the weight middle value is greater than or equal to the value of the unit to be scheduled at the head of the queue in the currently scheduled queue.

5. The method according to claim 4, wherein the method further comprises:
reading out the tail pointer of the first circulation link list, accessing the currently scheduled queue by using the tail pointer of the first circulation link list as the address, and writing the front pointer value of the first circulation link list into the position of the next hop pointer;
updating the tail pointer of the first circulation link list with the front pointer of the first circulation link list; and
accessing the queue by using the front pointer of the first circulation link list as the address to obtain the next hop pointer, thus updating the front pointer of the first circulation link list.

6. The method according claim 1, wherein deleting one queue from the first circulation link list when the weight middle value of the queue in the link list is less than the unit to be scheduled at the head of the queue further comprises:
deleting the queue from the first circulation link list and not adding the queue into the second circulation link list, when the status of the queue is Empty.

7. The method according to claim 6, wherein the method further comprises:
deleting the queue from the first circulation link list and then adding the queue to the tail of the second circulation link list, if the status of the queue is not Empty and the weight middle value is less than the value of the unit to be scheduled at the head of the queue.

8. The method according to claim 1, wherein linking the queue deleted from the first circulation link list with the second circulation link list comprises:
linking the queue with the second circulation link list, when the status of the queue jumps from Empty to non-Empty and the linked-in flag is not Linked-in.

9. The method according to claim 1, wherein the method further comprises:
exchanging the first circulation link list with the second circulation link list, when the first circulation link list is Empty.

10. The method according to claim 2, wherein the method further comprises: exchanging the first circulation link list with the second circulation link list, when the first circulation link list is Empty.

11. The method according to claim 3, wherein the method further comprises: exchanging the first circulation link list with the second circulation link list, when the first circulation link list is Empty.

12. The method according to claim 4, wherein the method further comprises: exchanging the first circulation link list with the second circulation link list, when the first circulation link list is Empty.

13. The method according to claim 5, wherein the method further comprises: exchanging the first circulation link list with the second circulation link list, when the first circulation link list is Empty.

14. The method according to claim 6, wherein the method further comprises: exchanging the first circulation link list with the second circulation link list, when the first circulation link list is Empty.

15. The method according to claim 7, wherein the method further comprises: exchanging the first circulation link list with the second circulation link list, when the first circulation link list is Empty.

16. The method according to claim 8, wherein the method further comprises: exchanging the first circulation link list with the second circulation link list, when the first circulation link list is Empty.

* * * * *